US008880052B2

(12) United States Patent
Ashraf et al.

(10) Patent No.: US 8,880,052 B2
(45) Date of Patent: Nov. 4, 2014

(54) EVOLVING ALGORITHMS FOR NETWORK NODE CONTROL IN A TELECOMMUNICATIONS NETWORK BY GENETIC PROGRAMMING

(75) Inventors: Imran Ashraf, Swindon (GB); Lester Tse Wee Ho, Blanchardstown (IE); Holger Claussen, Straffan (IE); Louis Gwyn Samuel, Dalkey (IE)

(73) Assignee: Alcatel Lucent, Boulogne-Billancourt (FR)

( * ) Notice: Subject to any disclaimer, the term of this patent is extended or adjusted under 35 U.S.C. 154(b) by 495 days.

(21) Appl. No.: 13/256,736

(22) PCT Filed: Mar. 12, 2010

(86) PCT No.: PCT/EP2010/001579
§ 371 (c)(1),
(2), (4) Date: Nov. 23, 2011

(87) PCT Pub. No.: WO2010/105781
PCT Pub. Date: Sep. 23, 2010

(65) Prior Publication Data
US 2012/0100842 A1  Apr. 26, 2012

(30) Foreign Application Priority Data
Mar. 17, 2009 (EP) .................................... 09290196

(51) Int. Cl.
*H04M 3/00* (2006.01)
*G06N 3/12* (2006.01)

(52) U.S. Cl.
CPC ...................................... *G06N 3/126* (2013.01)
USPC ............. 455/419; 455/418; 455/420; 712/28; 717/151; 717/168

(58) Field of Classification Search
CPC ........................................................ G06N 3/126
USPC .......... 455/418–420; 712/1, 28–31, 200–203, 712/214, 215; 717/151, 168–178
See application file for complete search history.

(56) References Cited

U.S. PATENT DOCUMENTS 6,625,135 B1 * 9/2003 Johnson et al. ................ 370/332
7,471,928 B2 * 12/2008 Axnas et al. ..................... 455/69

(Continued)

FOREIGN PATENT DOCUMENTS

| JP | 2006-514518 A | 4/2006 |
| JP | 2006-518126 A | 8/2006 |
| JP | 2007-158728 A | 6/2007 |

OTHER PUBLICATIONS

Krishan Sabnani (Alcatel-Lucent, "Autonomic Networking Research at Bell Labs", Nov. 2008).*

(Continued)

*Primary Examiner* — Ronald Eisner
(74) *Attorney, Agent, or Firm* — Fay Sharpe LLP

(57) ABSTRACT

A method is provided of evolving algorithms for network node control in a telecommunications network by genetic programming to (a) generate algorithms (b) determining fitness level of the algorithms based on a model of the telecommunications network and (c) select the algorithm that meet a predetermined fitness level or number of generations of evolution. The model is updated and the steps (a), (b) and (c) are repeated automatically to provide a series of algorithms over time adapted to the changing model of the network for possible implementation in the network.

20 Claims, 6 Drawing Sheets

(56) References Cited

U.S. PATENT DOCUMENTS

| | | | |
|---|---|---|---|
| 7,719,973 | B2 | 5/2010 | Abedi |
| 2003/0083936 | A1* | 5/2003 | Mueller et al. ................... 705/14 |
| 2003/0171132 | A1* | 9/2003 | Ho et al. ......................... 455/522 |
| 2006/0013245 | A1 | 1/2006 | Abedi |
| 2009/0082034 | A1* | 3/2009 | Gray et al. ................. 455/456.1 |
| 2010/0062770 | A1 | 3/2010 | Flynn et al. |

OTHER PUBLICATIONS

P. Polakos et al., "Beyond the Base Station Router . . . Not Your Parent's Flat Cellular Network," Alcatel-Lucent Innovation Days: Dec. 4, 2008 (Paris, France), XP007909376, 7 pages, Dec. 1, 2008.

H Claussen, "Autonomous Self-Deployment of Wireless Access Networks in an Airport Environment," Lecture Notes in Computer Science, vol. 3854, XP019029298, pp. 86-98, Feb. 27, 2006.

F. J. Mullany et al., Self-Deployment, Self-Configuration: Critical Future Paradigms for Wireless Access Networks, Lecture Notes in Computer Science, vol. 3457, XP019012576, pp. 58-68, Jul. 2, 2005.

A. Nguyen et al., "Learning from Nature: Network Architecture Inspired by Biology," Crossroads, vol. 11, No. 4, XP007909401, 6 pages, 2005.

Sabnani, "Autonomic Networking Research at Bell Labs," Proceedings of the ASN Symposium, XP055004023, 16 pages, 2008.

T. Lewis et al., "Enhancing IEEE802.11 DCF Using Genetic Programming," Proceedings of VTC2006-Spring vol. 6, XP055004039, pp. 1261-1265, 2006.

J. Hu et al., "Wireless Access Point Configuration by Genetic Programming," Proceedings of CEC'04, vol. 1, XP0107208690, pp. 1178-1184, 2004.

International Search Report for PCT/EP2010/001579 dated Apr. 23, 2010.

Abedi et al., Hybrid Genetic Packet Scheduling and Radio Resource Management for High Speed Downlink Packet Access, IEEE, 5th International Symposium on Wireless Personal Multimedia Communications, Oct. 27, 2002, V3, pp. 1192-1196.

English Bibliography for JP Pat. App. Publication No. JP 2006-514518, Published Apr. 27, 2006, in Japanese, Printed From Thomson Innovation on Jun. 12, 2013, 4 pp.

English Bibliography for JP Pat. App. Publication No. JP 2006-518126, Published Aug. 3, 2006, in Japanese, Printed From Thomson Innovation on Jun. 12, 2013, 4 pp.

English Bibliography for JP Pat. App. Publication No. JP 2006-158728, Published Jun. 21, 2007, in Japanese, Printed From Thomson Innovation on Jun. 12, 2013, 3 pp.

\* cited by examiner

EVOLVING ALGORITHMS FOR NETWORK NODE CONTROL IN A TELECOMMUNICATIONS NETWORK BY GENETIC PROGRAMMING

FIELD OF THE INVENTION

The present invention relates to telecommunications, in particular to telecommunications networks.

DESCRIPTION OF THE RELATED ART

Telecommunications networks increasingly incorporate abilities to self-configure, self-organize and self-adapt. As the size and complexity of telecommunications networks increases, there is a drive to implement these so-called "self-x" properties in a decentralized manner, namely where each node can act individually using only local information.

Accordingly, there is a growing need to develop self-x algorithms, i.e. algorithms for network node self-adaptation, that have to work without global information about the network nor coordinated central control of the network nodes. Some examples of self-x algorithms in wireless networks include algorithms for optimizing cell coverage and capacity, and resource scheduling algorithms. Some examples in the field of wireline networks are routing algorithms that operate dependent upon a variety of variables, such as traffic load level, number of hops between nodes along communication paths, and Quality of Service (QoS) requirements.

A known approach is for self-x algorithms to be designed by skilled engineers. based on specific assumptions about the network that may not be realistic, so there is often a need for the algorithms to be evaluated, revised and refined after they have been implemented in networks. This can be a slow and expensive process.

Genetic programming is a known evolutionary approach to generating an algorithm, see for example Koza, J. R., Genetic Programming: On the Programming of Computers by Means of Natural Selection 1992: MIT Press, 840.

Genetic programming is described briefly here to ease the understanding of the reader.

As shown in FIG. 1, genetic programming (GP) involves the following steps:
  (i) Initialize a population of algorithms—a population is the term used for a collection of individual algorithms, the algorithms in the initial population being generated at least somewhat randomly;
  (ii) Calculate the fitness of each of the algorithms in the population—fitness being the term used for a measure of the algorithms performance in achieving the task of the algorithm;
  (iii) Select algorithms to become "parents" based on their fitness;
  (iv) Create new algorithms by applying genetic operators, such as mutation and crossover to the parents selected in the previous step;
  (v) Produce the next generation population of algorithms using newly created algorithms and survivors chosen from the previous generation population.

The above steps (ii) to (v) are repeated until a termination condition is met (for example the process has gone through a set number of generations, or a target fitness level is met by an algorithm that has been created).

As shown in FIG. 2, a parse tree representation is typically used in genetic programming (GP) in order to encode an algorithm into a form upon which genetic programming operations can be performed. The parse tree can be used to represent various forms of algorithms, such as computer programs. Algorithms can be represented in other forms, such as by state transition diagrams.

FIG. 3 shows illustrative examples of the crossover and mutation operators mentioned above. Crossover is mixing components from two parent algorithms to produce a next generation (i.e child) algorithm. Mutation is modifying part of an individual parent algorithm to produce a next generation algorithm.

Use of genetic programming to generate an algorithm for use in a telecommunications network is described in a paper by Lewis T., Fanning N. and Clemo G. entitled "Enhancing IEEE802.11 DCF using Genetic Programming", IEEE 2006.

SUMMARY

The reader is referred to the appended independent claims. Some preferred features are laid out in the dependent claims.

An example of the present invention is a method of evolving algorithms for network node control in a telecommunications network by genetic programming to (a) generate algorithms (b) determining fitness level of the algorithms based on a model of the telecommunications network and (c) select the algorithm that meet a predetermined fitness level or number of generations of evolution. The model is updated and the steps (a), (b) and (c) are repeated automatically to provide a series of algorithms over time adapted to the changing model of the network for possible implementation in the network.

This process may be performed periodically throughout the operation of the network so that algorithms implemented in the network are adapted to the changing network.

In preferred embodiments, a central network node uses genetic programming to generate new algorithms for use by network nodes, and information of the network is used to update an internal model of the network. For example, the information may be obtained from measurements made by the network or input by engineers. Preferably, the node uses that model along with genetic programming building blocks to create algorithms that meet a target criterion such as of fitness level or number of generations of evolution. Preferably once such an algorithm is provided, it is tested and if deemed acceptable implemented in the network nodes.

This approach is particularly suitable to changing networks, for example self-configuring networks, for example comprising femtocell base station, and suitable for providing algorithms for implementation that are themselves self-adapting algorithms.

BRIEF DESCRIPTION OF THE DRAWINGS

Embodiments of the present invention will now be described by way of example and with reference to the drawings, in which.

DETAILED DESCRIPTION

When considering a known system, the inventors realized that genetic programming could be applied to telecommunications networks in such a way as to periodically and automatically optimize them.

An example network will now be described, before focusing in on an example network genetic programming server and its operation.

In this description we used the term algorithm to mean a set of rules or a method that is used to solve a problem or perform a task. An algorithm may be specified in the form of a mathematical formula having technical application, a computer program, a representation of a system's behavior such as a state transition diagram or flowchart. Examples of algorithms in telecommunications networks are a method to automatically adjust the coverage area of a radio cell, and a method of routing traffic through a network.

Network

Figure 1:
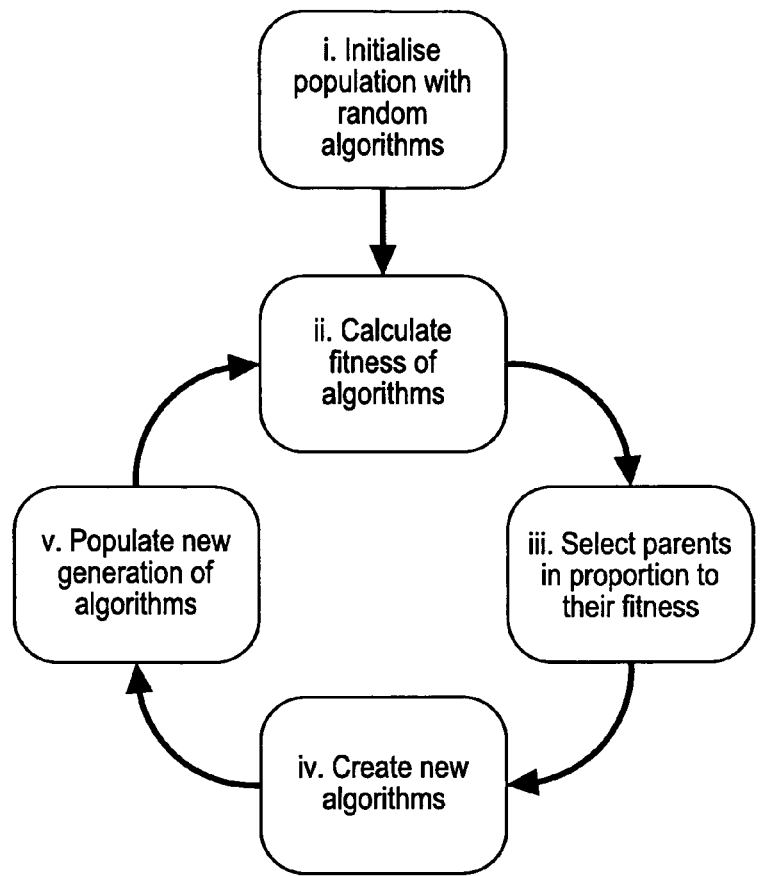
FIG. 1 is a diagram illustrating schematically a genetic programming process (PRIOR ART)
Figure 2:
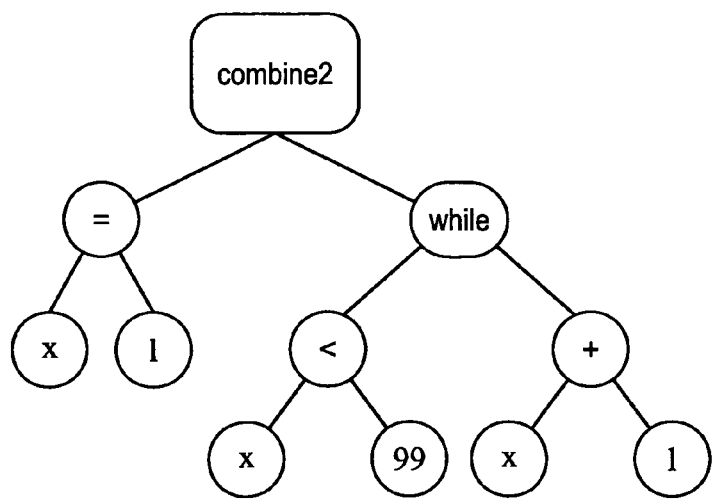
FIG. 2 is a diagram illustrating a computer program represented in the form of a parse tree (PRIOR ART)
Figure 3A:
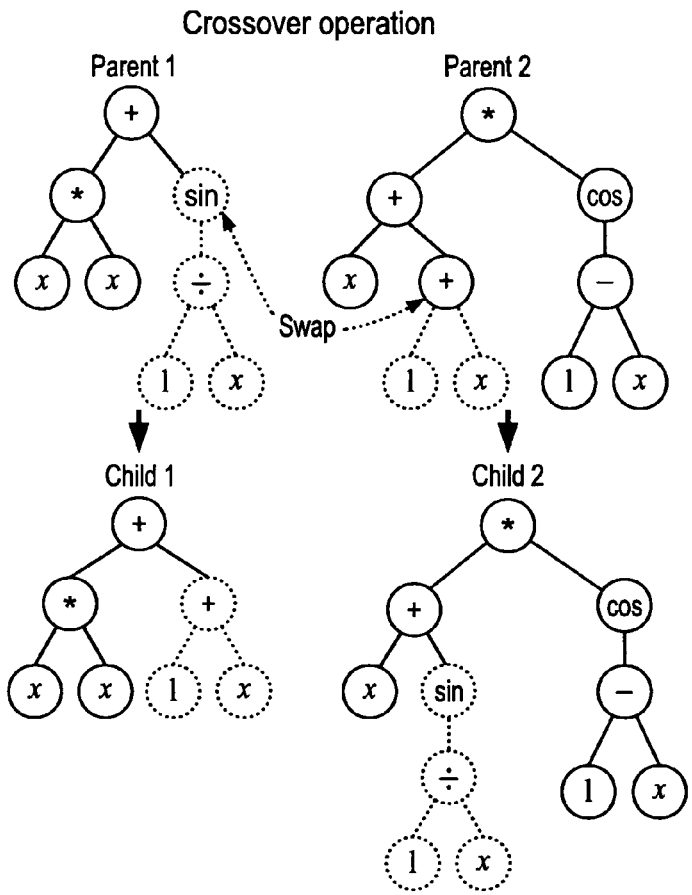
FIG. 3 is a diagram illustrating crossover and mutation operations applied in genetic programming to program portions represented as parse trees (PRIOR ART)
Figure 3B:
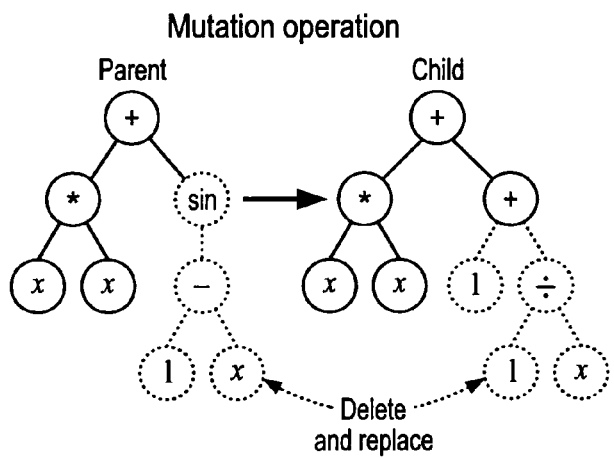
Figure 4:
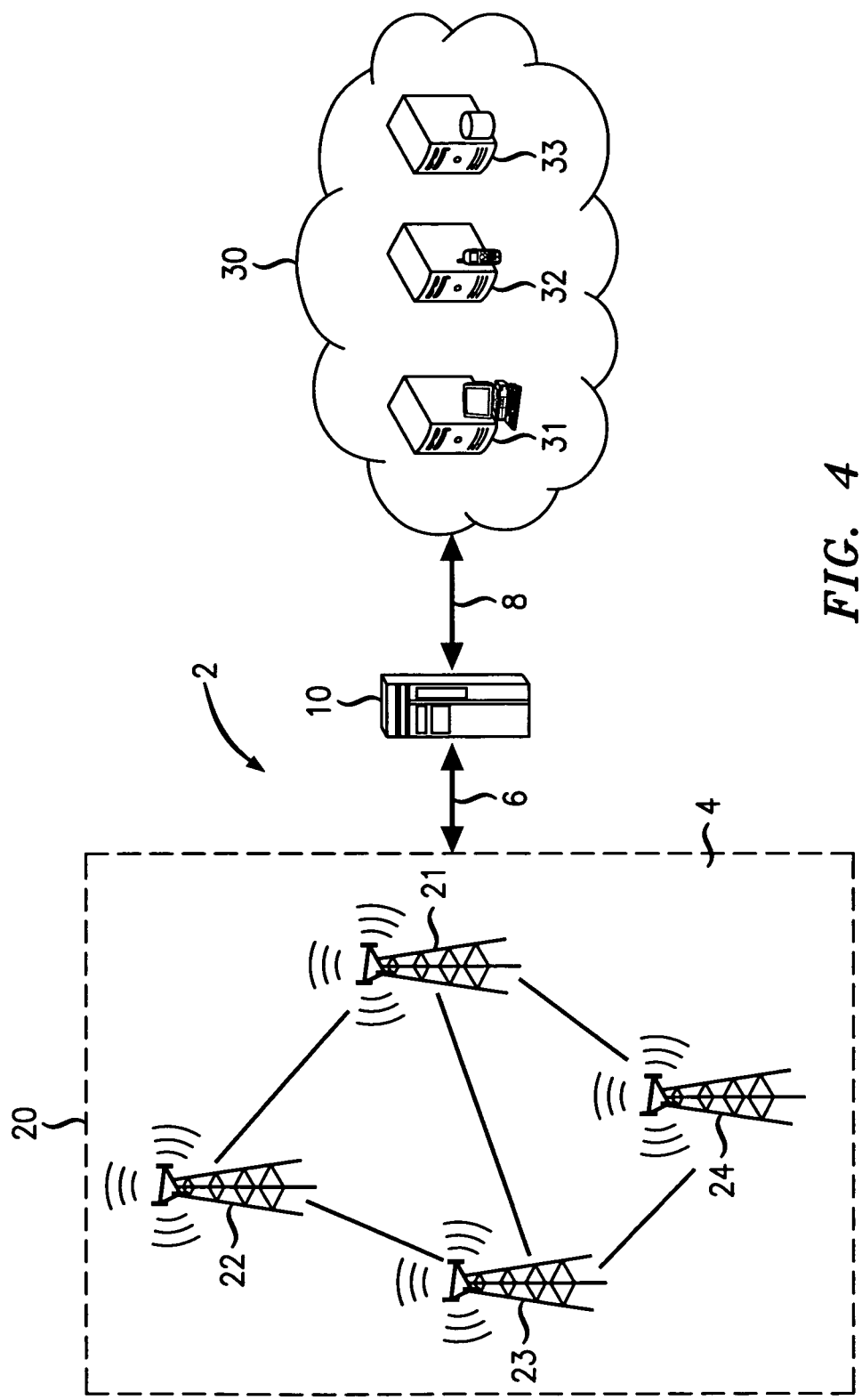
FIG. 4 is a schematic representation of a network for wireless telecommunications according to a first embodiment of the invention including a network genetic programming server.

As shown in FIG. 4, the telecommunications network 2 includes a radio access network 4 which includes some interconnected cellular base stations 21,22,23,24. The cellular base stations 21,22,23,24 have a communication link 6 to a network genetic programming server 10. The network genetic programming server 10 is also connected via a communication link or links 8 to various network entities in the core network 30. The various network entities include a network management system 31, a master switching centre 32 and a database 33 containing network status information.

The base stations 21,22,23,24 all run an algorithm to perform a predetermined task.

The network genetic programming server 10 is used to provide new improved versions of the algorithm using genetic programming, as explained in more detail below.

Network Genetic Programming Server

Figure 5:
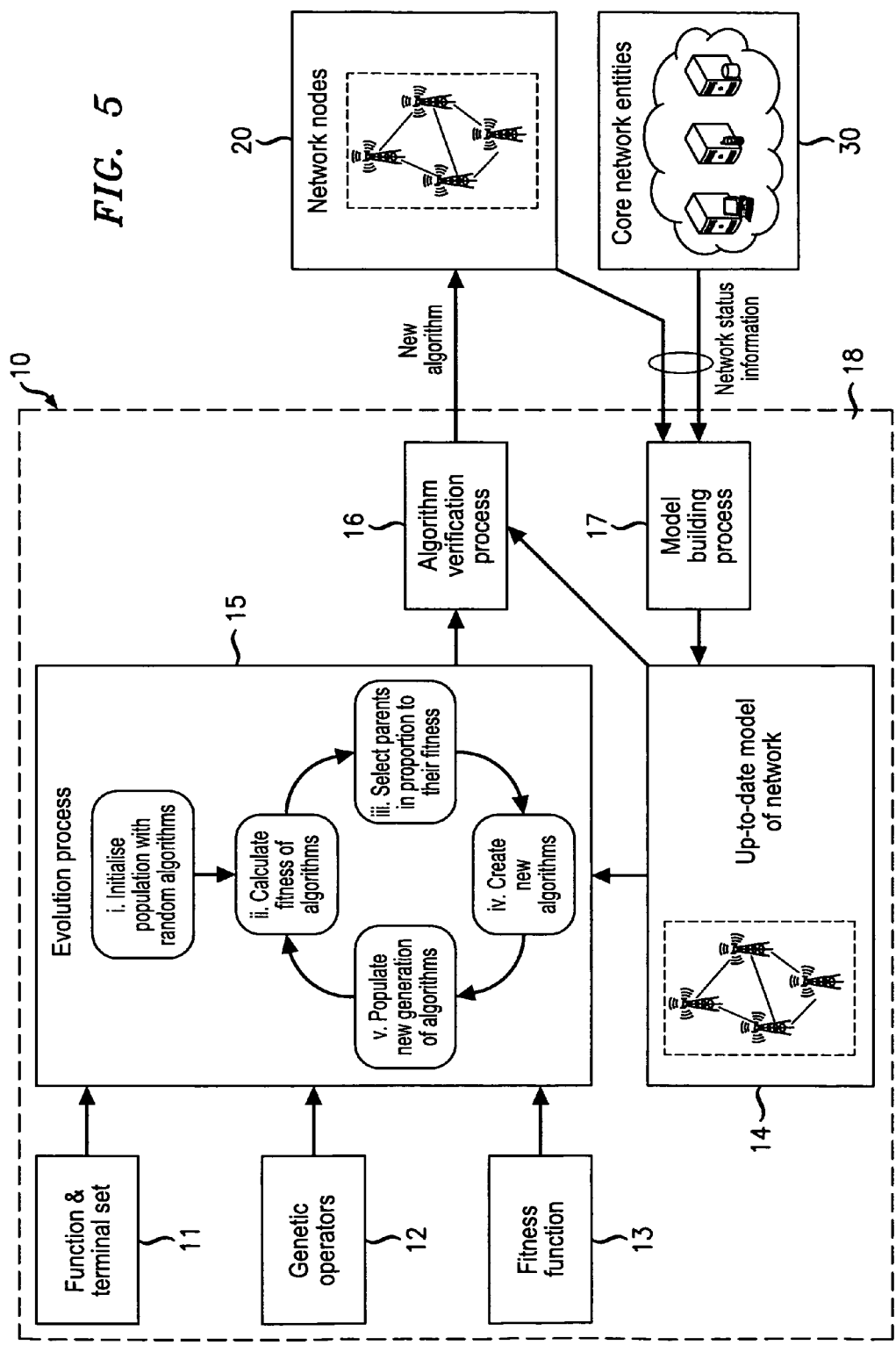
FIG. 5 is a diagram illustrating the network genetic programming server shown in FIG. 4.

As shown in FIG. 5, the network genetic programming server 10 that uses genetic programming to create algorithms used in the base stations includes a function and terminal set 11, genetic operators 12 and a fitness function 13 as inputs to an evolution processor 15. The function and terminal set 11 are the building blocks of the algorithms. The genetic operators 12 are operations that manipulate existing algorithms to create new ones, and include operations such as mutation and crossover. The fitness function 13 is a function used to calculate the fitness, in other words performance of the algorithms. The fitness function 13 is predetermined based, for example, on network operator's requirements. The fitness function 13 is modified repeatedly during the operation of the network genetic programming server 10 as the network operator's requirements change, for example the network operator may wish to provide greater resources to higher-paying users.

In use, the evolution processor 15 acts to run simulations of the network using the information of the model 14 of the network and various different generated algorithms and the performance results are used together with the fitness function 13 to calculate the fitness associated with each algorithm. An up-to-date model 14, of the network is used in these simulations.

The function and terminal set 11, genetic operators 12, a fitness function 13 and the model 14 simulation results from simulator 18 are input to an evolution processor 15. The evolution processor 15 undertakes genetic programming.

As previously described, genetic programming (GP) involves the following steps:
(i) Initialize a population of algorithms—a population is the term used for a collection of individual algorithms, the algorithms in the initial population being generated at least somewhat randomly;
(ii) Calculate the fitness of each of the algorithms in the population—fitness being the term used for a measure of the algorithms performance in achieving the task of the algorithm;
(iii) Select algorithms to become "parents" based on their fitness;
(iv) Create new algorithms by applying genetic operators, such as mutation and crossover to the parents selected in the previous step;
(v) Produce the next generation population of algorithms using newly created algorithms and survivors chosen from the previous generation population.

The above steps (ii) to (v) are repeated until a termination condition is met (for example the process has gone through a set number of generations to provide an algorithm, or a target fitness level is met by an algorithm that has been created).

It can be considered that the algorithm output from the evolution processor 15 is one that has been selected by the evolution process. This algorithm is output from the evolution processor 15 to an algorithm verification processor 16.

The algorithm verification processor 16 pre-tests the algorithm to check suitability for deployment in the network 2. The tests are done prior to deployment and are intended to ensure that the algorithm is well-behaved and will not cause unwanted behaviors to occur in the network. This testing is particularly important for self-x algorithms (i.e. self-configuring, self-organizing etc) for decentralized control of networks, as undesirable and unexpected behavior may occur. Such undesirable behaviors can cause inefficient operation of the network and in extreme cases can cause cascading failures throughout the network. It should be noted that adverse effects can occur generally in algorithms and are not a specific side effect of being generated by genetic programming. Once the algorithm has been pre-tested and deemed suitable, the algorithm is implemented in the appropriate network nodes, in this example the base stations 21,22,23,24 of the radio access network 20.

In the network genetic programming server 10, there is a model building processor 17 which acts on the model 14 of the network to keep the model 14 up to date by incorporating any significant changes that occur in the real world and may have an impact on the algorithm evolution process, and also to continually refine the model so as to improve its accuracy. Accordingly, the model changes by being updated from time to time, for example periodically. The model building processor 17 uses information on the network that is obtained from the network nodes themselves, appropriate core network entities 30 and other sources (not shown) such as manual input by engineers.

Accordingly, as explained above, the network genetic programming server 10 generates new and improved algorithms to be used in the network nodes on a periodic and automatic basis.

Figure 6:
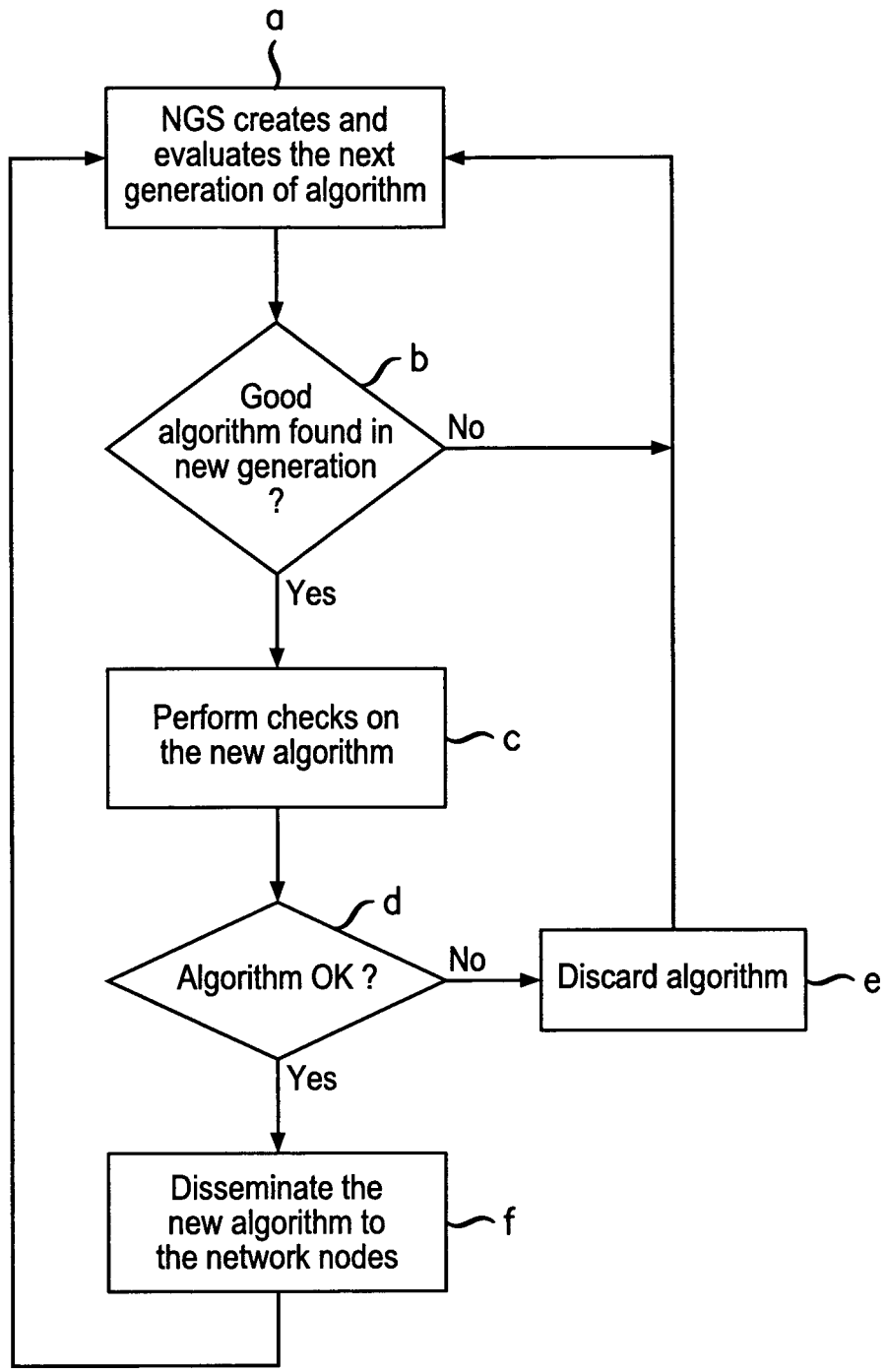
FIG. 6 is a flow chart illustrating operation of the network genetic programming server.

A flowchart of the main steps taken in this automated process is shown in FIG. 6.

As shown in FIG. 6, in the network genetic programming server, a next generation algorithm is generated and evaluated (step a) as to fitness level. A determination is made (step b) as to whether a generated algorithm meets a predetermined fitness level. Upon the predetermined fitness level being met, the algorithm is deemed good enough for the algorithm verification process to be undertaken. As explained above, the algorithm verification processor 16 pre-tests (step c) the algorithm to check suitability for deployment in the network 2. A determination is then made (step d) as to whether the tests are failed or passed. If the tests are failed the algorithm is discarded (step e) and a return is made to the generation and fitness evaluation (step a). On the other hand, if the tests are passed, then the algorithm is disseminated (step f) to the network nodes.

The steps a and b in FIG. 6 occur in the evolution processor 15 shown in FIG. 5. The steps c, d, and e in FIG. 6 occur in the algorithm verification processor 16 shown in FIG. 5.

Optimizing Radio Coverage

Figure 7:
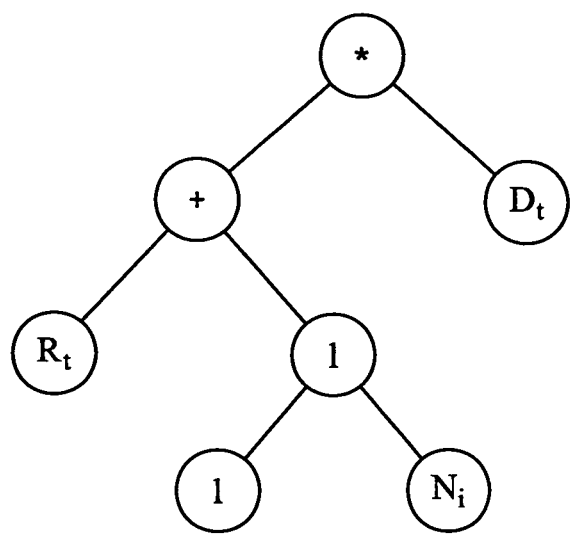
FIG. 7 is an example genetically engineered program for optimizing radio cell coverage and provided by the network genetic programming server.

An example of a type of algorithm that would be subject to genetic programming and selection as explained above is one for optimizing radio coverage of a cell in a wireless network, in other words automatically adjusting the radio coverage are of a base station based on measurements made in the network in the environment of the base station. An example of this type of algorithm is represented in FIG. 7 both in the form of a parse tree and as an equation. The equation is:

$$R_{t+1} = \left(R_t + \frac{1}{N_i}\right) \times D_t$$

where $D_t$ denotes Number of calls dropped during timeslot t, $R_t$ denotes Cell radius during timeslot t, and $N_i$ denotes Total number of increments performed.

Example function and terminal sets used as input to the evolution processor in this example are as follows:

Function set F={+,−,*,/}, is composed of basic mathematical operations.

Terminal set T={Dt, Rt, Ct, Ni, 1}, is composed of measurements, node states, and constants as follows:

$D_t$—Number of calls dropped during timeslot t.
$R_t$—Cell radius during timeslot t.
C—Coverage overlap.
$N_i$—Total number of increments performed.

In this example it is envisaged that the network include a centralized controlling entity namely a network genetic programming server. In an alternative embodiment, the network genetic programming server function may be spread in a decentralized way among the network nodes, for example spread across multiple base stations or base station controllers.

The approach above has been focused on use of genetic programming to generate self-x, i.e. self-configuring, self-adapting algorithms. In some other embodiments, the approach is used to provide algorithms for implementation that are not self-x algorithms.

General

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

A person skilled in the art would readily recognize that steps of various above-described methods can be performed by programmed computers. Some embodiments relate to program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. Some embodiments involve computers programmed to perform said steps of the above-described methods.

The invention claimed is:

1. A method of evolving algorithms for network node control in a telecommunications network, comprising:
    at a central network node, evolving control algorithms for multiple network nodes of a telecommunications network using a genetic programming process, the telecommunications network formed by a plurality of network nodes, the plurality of network nodes including the central network node and the multiple network nodes, the genetic programming process comprising:
        generating next generation control algorithms for the multiple network nodes,
        determining a fitness level of the next generation control algorithms based at least in part on a model of the telecommunications network, the model including the multiple network nodes and a network environment in relation to the multiple network nodes,
        selecting each next generation control algorithm that meets a predetermined fitness level in relation to performance of a particular task associated with the corresponding control algorithm or that results from a predetermined number of generations of evolution,
        updating the model and repeating the generating, determining, and selecting of the genetic programming process to provide a series of next generation control algorithms adapted to changes in the model, and
        verifying suitability of each control algorithm of the series of next generation control algorithms to identify one or more next generation control algorithms suitable for implementation by the multiple network nodes to perform the particular task associated with the corresponding control algorithm.

2. The method according to claim 1, in which the model is updated periodically.

3. The method according to claim 1, in which the generating, determining, and selecting of the genetic programming process are repeated periodically.

4. The method according to claim 1, in which the series of next generation control algorithms provided include at least one control algorithm for self-configuration of individual network nodes of the multiple network nodes.

5. The method according to claim 1, in which the telecommunications network includes a wireless telecommunications network and the multiple network nodes are multiple base stations in the wireless telecommunications network, wherein at least one of the control algorithms evolved at the central network node is for adjusting radio coverage areas of individual base stations of the multiple base stations.

6. The method according to claim 1, in which the telecommunications network is a self configuring network based at least in part on evolution of the control algorithms.

7. The method according to claim 1, in which the multiple network nodes include one or more femtocell base stations.

8. The method according to claim 1, further comprising:
    at the multiple network nodes, implementing at least one control algorithm deemed suitable for the multiple network nodes.

9. The method according to claim 1, in which a fitness function is used to determine the fitness level of the next generation control algorithms at the central network node and the fitness function is adapted to changes in the model.

10. The method according to claim 1 in which the model is updated based at least in part on feedback information from the multiple network nodes.

11. A central network node for evolving algorithms for network node control in a telecommunications network, the central network node comprising:
   a model building processor configured to periodically update a model of a telecommunications network formed by a plurality of network nodes, the model including multiple network nodes and a network environment in relation to the multiple network nodes, the plurality of network nodes including the central network node and the multiple network nodes, and
   an evolution processor configured to evolve control algorithms for the multiple network nodes using a genetic programming process, wherein, in conjunction with the genetic programming process, the evolution processor is configured to generate next generation control algorithms, to determine a fitness level of the next generation control algorithms based at least on part on the model, to select each next generation control algorithm meeting a predetermined fitness level in relation to performance of a particular task associated with the corresponding control algorithm or resulting from a predetermined number of generations of evolution, and to repeat the generating, determining, and selecting of the genetic programming process in response to updates to the model to provide a series of next generation control algorithms adapted to changes in the model,
   wherein the evolution processor is configured to use a fitness function to determine the fitness level of the next generation control algorithms and to adapt the fitness function to changes in the model.

12. The central network node according to claim 11, further comprising:
   a verification processor configured to verify suitability of each control algorithm of the series of next generation control algorithms to identify one or more next generation control algorithm suitable for implementation by the multiple network nodes to perform the particular task associated with the corresponding control algorithm.

13. The central network node according to claim 11, in which the series of next generation control algorithms provided include at least one control algorithm for self-configuring individual network nodes of the multiple network nodes.

14. A non-transitory computer-readable medium storing program that, when executed by at least one processor, cause a corresponding processor-controlled device to perform a method of evolving algorithms for network node control in a telecommunications network, the method comprising:
evolving control algorithms for multiple network nodes of a telecommunications network formed by a plurality of network nodes using a genetic programming process, the plurality of network nodes including the multiple network nodes, the genetic programming process comprising:
   generating next generation control algorithms,
   determining a fitness level of the next generation control algorithms based at least in part on a model of the telecommunications network, the model including the multiple network nodes and a network environment in relation to the multiple network nodes,
   selecting each next generation control algorithm that meets a predetermined fitness level in relation to performance of a particular task associated with the corresponding control algorithm or results after a predetermined number of generations of evolution,
   updating the model and repeating the generating, determining, and selecting of the genetic programming process to provide a series of next generation control algorithms adapted to changes in the model, and
verifying suitability of each control algorithm of the series of next generation control algorithms to identify one or more next generation control algorithm suitable for implementation by the multiple network nodes to perform the particular task associated with the corresponding control algorithm.

15. The central network node according to claim 11, wherein the model building processor is configured to periodically update the model.

16. The central network node according to claim 11, wherein the evolution processor is configured to periodically repeat the generating, determining, and selecting of the genetic programming process.

17. The central network node according to claim 11, wherein the telecommunications network includes a wireless telecommunications network and the multiple network nodes are multiple base stations in the wireless telecommunications network, wherein at least one of the control algorithms evolved by the evolution processor is for adjusting radio coverage areas of individual base stations of the multiple base stations.

18. The central network node according to claim 11, wherein the telecommunications network is a self configuring network based at least in part on evolution of the control algorithms.

19. The central network node according to claim 11, wherein the multiple network nodes include one or more femtocell base stations.

20. The central network node according to claim 11, wherein the model building processor is configured to update the model based at least in part on feedback information from the multiple network nodes.

* * * * *